Feb. 27, 1962 D. S. BASIM ET AL 3,023,407

DOPPLER SYSTEM LAND-WATER DETECTOR

Filed May 18, 1959 5 Sheets-Sheet 1

INVENTORS.
DONALD S. BASIM
ROBERT A. FLOWER
MICHAEL W. MCKAY

BY H. S. Mackey
ATTORNEY.

Feb. 27, 1962 D. S. BASIM ET AL 3,023,407

DOPPLER SYSTEM LAND-WATER DETECTOR

Filed May 18, 1959

INVENTOR.
DONALD S. BASIM
ROBERT A. FLOWER
MICHAEL W. MCKAY

BY H. L. Mackey

ATTORNEY.

INVENTORS.
DONALD S. BASIM
ROBERT A. FLOWER
MICHAEL W. MCKAY
BY H. S. Mackey
ATTORNEY.

DOPPLER SYSTEM LAND-WATER DETECTOR

Filed May 18, 1959

INVENTORS.
DONALD S. BASIM
ROBERT A. FLOWER
MICHAEL W. MCKAY

BY

H. L. Mackey
ATTORNEY.

DOPPLER SYSTEM LAND-WATER DETECTOR

Filed May 18, 1959

INVENTORS.
DONALD S. BASIM
ROBERT A. FLOWER
MICHAEL W. MCKAY
BY H. L. Mackey
ATTORNEY.

3,023,407

DOPPLER SYSTEM LAND-WATER DETECTOR

Donald S. Basim, Stamford, Conn., and Robert A. Flower, White Plains, and Michael W. McKay, Tarrytown, N.Y., assignors to General Precision Inc., a corporation of Delaware Filed May 18, 1959, Ser. No. 813,846
10 Claims. (Cl. 343—5)

This invention relates to airborne microwave Doppler navigation systems and more specifically to such systems which distinguish between water and land targets.

Doppler systems for dead reckoning navigation employ at least one beam of microwave radiation directed obliquely downward at an angle with the aircraft vertical. The beam is reflected or scattered at the surface of the earth and some of the reflected or back-scattered energy is picked up at the aircraft. By observing the Doppler frequency difference of the received and transmitted beams, the speed of the aircraft in the ground track direction can be found. The ratio between the Doppler frequency difference in cycles per second and the aircraft's speed in knots is termed the calibration constant of the navigating instrument.

The calibration constant, C, is defined by $$C=\frac{D}{V}=\frac{2\cos\gamma}{\lambda} \quad (1)$$

in which D is the Doppler frequency difference, V is the aircraft speed in the direction of its motion, $\gamma$ is the angle between the aircraft's velocity direction and the direction of the transmitted microwave beam, and $\lambda$ is the radiated wavelength. When the beam is very narrow, $\gamma$ is almost exactly the same for all parts of the beam and the received spectrum is narrow. When, however, the microwave beam is wide, in the direction of the horizontal component of the aircraft velocity vector, the received spectrum is wide, one reason being that the angle $\gamma$ is not the same throughout the beam.

The echo or back-scatter from rough land terrain has almost equal intensity in all directions and is substantially independent of the direction of the irradiating beam. On the contrary, a smooth water surface reflects in a manner to some extent resembling specular optical reflection, for much of the energy is reflected at an angle to the perpendicular equal and opposite to the inicident angle of the irradiation. A rough water surface reflects in a manner intermediate between that of smooth water and that of rough land. It follows that, when water is irradiated at an angle, the energy reflected back in the incident direction is much greater when the incident angle to the normal is small, and the energy falls off very rapidly as the incident angle is increased.

As an example, when a microwave beam is projected from an aircraft normally to a surface the received energy is much greater when the surface is water than when the surface is land. At an incident angle of 18° the land and water reflections are equal in intensity at the aircraft, and at an angle of 28° the land reflections are stronger than the water reflections.

These facts of themselves would not affect the operation of a Doppler navigating instrument containing automatic gain control circuits if the microwave beam were very narrow, but such instruments employ beams several degrees in width, so that the received spectrum is symmetric in overland operation but is skewed and asymmetric when the target is a water surface because of the variation in the back-scatter intensity over the beam width. Thus, when the average spectrum frequency is automatically found by the frequency-tracking component of the navigating instrument receiver, its value is different in the symmetric and asymmetric cases. This aberration can be nullified by an instrumental adjustment which changes the ratio between the received Doppler frequency and the instruments output speed indications, or the calibration constant of the instrument.

The present invention takes advantage of the variations in reflection intensity at 0° and 28° and over land and water. A signal received at 0° incident and back-scatter angle is compared in strength with that of a signal received at about 28° incident and back-scatter angle. The difference between over-land and over-water operation in this comparison may be as much as 35 db. This difference is caused to operate a signal indicating the nature of the terrain beneath the aircraft and also to operate a switch in the navigating instrument changing its calibration constant.

The purpose of this invention is to nullify the error in Doppler apparatus caused by operation over water.

More specifically, the purpose of this invention, applied to Doppler apparatus calibrated over land, is to nullify the error caused by operating the apparatus over water.

A further understanding of this invention may be secured from the detailed description and associated drawings, in which.

Figure 1:
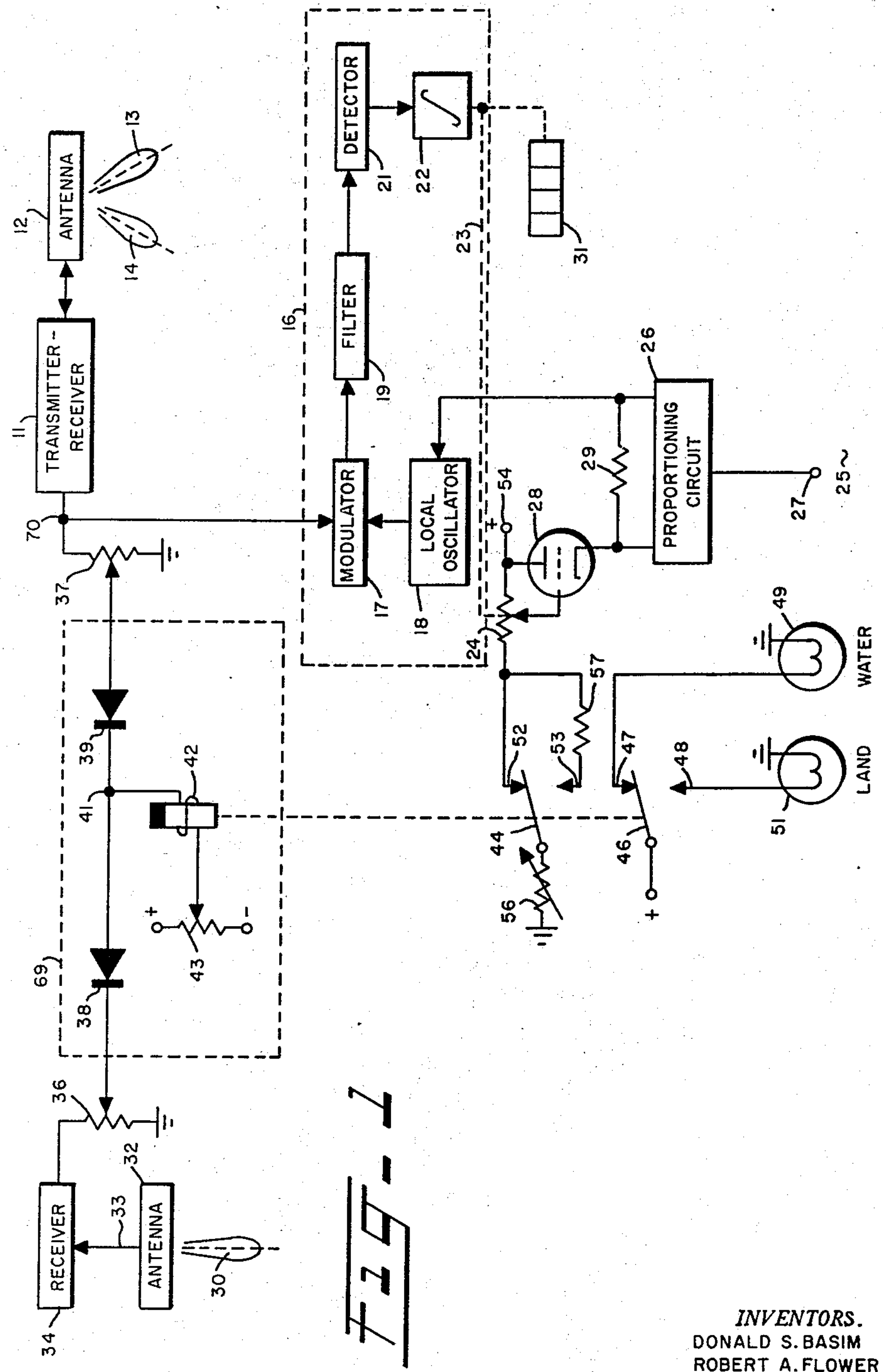
FIGURE 1 is a schematic drawing of an embodiment of the invention employing a special receiver and vertical antenna.

Referring now to FIG. 1, an aircraft Doppler navigating instrument comprises a microwave receiver-transmitter 11 associated with a microwave beam antenna 12. This antenna radiates at least one beam of microwave energy obliquely from the aircraft toward the earth, generally employing three or four beams simultaneously or consecutively radiated. Two such beams, 13 and 14, emitted at equal angles of 28° with the vertical, are depicted as illustrative examples. The receiver output of transmitter-receiver 11 is applied to a frequency tracker which has the functions of finding and tracking the median frequency of the Doppler spectrum. The frequency tracker comprises all of the components enclosed within the dashed line 16. Modulator 17 receives the Doppler signal from receiver 11 and a heterodyning signal from local oscillator 18. The modulated output is applied to a narrow resonant filter 19, the output of which is detected in detector 21. The demodulated detector output is integrated in integrator 22, the ouput of which is applied as a correction signal to the local oscillator 18, changing its frequency of oscillation in such manner as to maintain the input to filter 19 at the resonant frequency thereof. The integrator output consists of the angular deflection of a shaft 23, which is converted by potentiometer 24 into a proportional voltage suitable for correcting the frequency of the local oscillator 18.

In order to secure error sense, the angular deflection of shaft 23, converted by the potentiometer 24 into a direct voltage proportional thereto, is power amplified in a cathode follower 28, then mixed with a proportional amount of 25-c.p.s. alternating current in resistor 29 and a proportioning circuit 26. The output is applied to control the local oscillator 18, thus frequency-modulating it with excursions above and below the mean value representing the integrator 22 output.

The angular rotation of the integrator shaft 23 constitutes the instrument output, and is indicated by counter 31 calibrated directly in aircraft speed units.

A second antenna 32 is provided for the exclusive purpose of providing a land-water indicating signal. This antenna 32 is so positioned that its beam reception direction 30 is perpendicular to the surface of the earth. In level flight a fixed antenna is satisfactory, but when the aircraft is in any other than a horizontal attitude it is preferable that both antennas 12 and 32 be horizontally stabilized.

The electrical signal output of the antenna 32, representing received microwave echo energy, is applied through a waveguide 33 to a receiver 34, which may be simply a demodulator followed by an audio-frequency amplifier. The output of the receiver is controlled by a potentiometer attenuator 36.

The Doppler signal output of the receiver portion of the receiver-transmitter 11 which is applied to the frequency tracker 16 is additionally applied to a potentiometer attenuator 37. The outputs of attenuators 36 and 37 are applied to a subtracting circuit consisting of two diodes 38 and 39 connected in series, with a load circuit connected to their junction 41. The load circuit consists of a polarized relay winding 42 returned to a level-setting potentiometer 43. The relay winding 42 operates two contact arms 44 and 46. Arm 46 has front and back contacts 47 and 48 connected to two lamps 49 and 51 marked "water" and "land." The contact arm 44 has front and back contacts 52 and 53. Contact 52 is connected through the potentiometer 24 to a positive terminal 54. Contact 53 is connected through a resistor 57 to contact 52. The arm 44 is connected through a rheostat 56 to ground. The rheostat 56 schematically represents slope, zero and basic calibration-constant adjustments provided by several pairs of attenuators.

Figure 2:
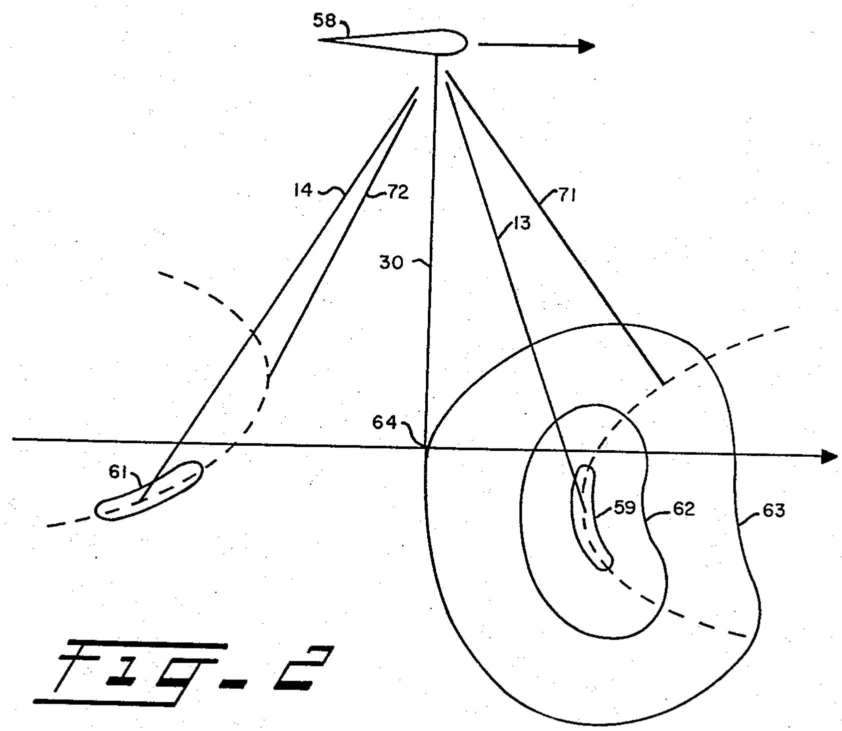
FIGURE 2 illustrates one form of ground illumination by a Doppler navigational instrument employed as example.

In the operation of the land-water indicating instrument of FIG. 1 let it be assumed that an airplane 58, FIG. 2, emits four microwave beams each at an angle with the vertical of 28°. The central rays, 13 and 14 of two of these beams are shown together with their 3-db-down illuminated target contours 59 and 61. Some transmitted signal illuminates the target outside of the 3-db contour of each beam, and some back-scattered signal is received at the airplane from these external target areas. These areas of beam 13 are indicated by the lower intensity contours 62 and 63 of its illuminated area. Thus, at some lower intensity, the beam illuminates the ground even as far from its central ray 13 as the point 64, vertically beneath the airplane, and some back-scattered signal can be received at the airplane from this point. Line 30 represents the central ray of the directional beam which can be received from this point 64, and from nearby areas of the target, by the highly directional receiving antenna 32, FIG. 1, positioned to receive vertical reflections.

Figure 3:
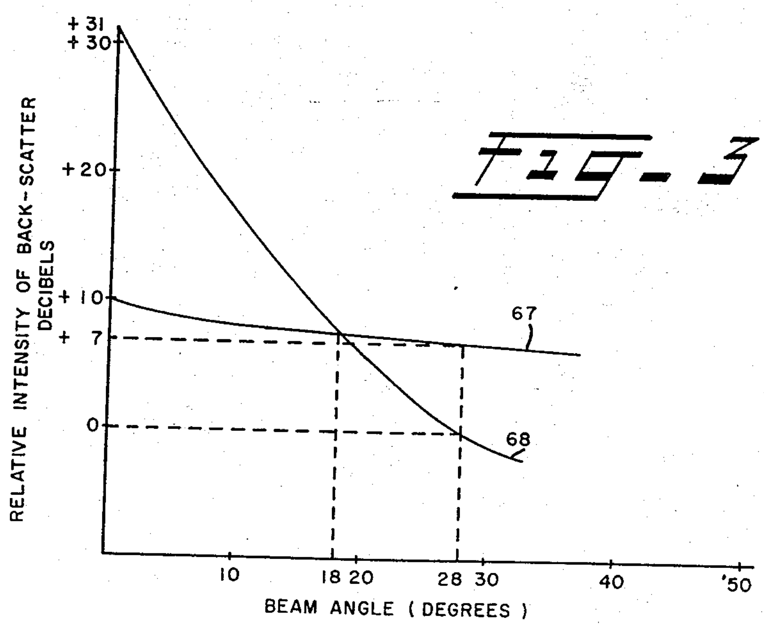
FIGURE 3 depicts graphs showing the difference in back-scatter from land and water.

Experiments on the relative magnitudes of signal return in decibels at various beam angles are summarized in the graphs of FIG. 3. Returns from land areas are shown by curve 67. This curve indicates that when the beam angle with the vertical is 28° the received signal strength is 7 db above an arbitrary level, and when the beam is vertical the relative signal strength is 10 db above the same level, or 3 db greater than the signal reflected at the 28° angle. Curve 68 illustrates the reflected signals back-scattered from fairly rough water having a surface roughness characterized as 3 on the GPL water surface condition scale, approximately the surface caused by a wind of strength 2 on the Beaufort scale. When such a surface is irradiated at an angle of 28° the back-scattered signal received at the transmitting location has an intensity on the above db scale of zero. When the beam is normal to the water surface the received intensity is increased by 31 db.

To summarize, when two antennas receiving signals reflected at angles of 28° and 0° are employed and the aircraft carrying then passes from over land to over water, the 28° antenna received strength drops 7 db while the 0° antenna strength rises 21 db. Thus the differential signal strength changes by 28 db. In passing from water to land the strength change is in the opposite direction. When the water surface is smooth the differential change is greater and when the water surface is rougher than GPL 3 the differential change is less. However, in no case is the differential change likely to be less than about 24 db.

The apparatus of FIG. 1 secures a signal representing this land-water difference and employs it to operate a 2-position relay. The vertical antenna 32 receives vertical back-scattered echo signals from the point 64, FIG. 2, resulting from the transmission from one or more of the 28° antennas. The received signal is down at least 8 db below what it would be if point 64 were illuminated from the vertical antenna, because of the signal strength pattern 59/62/63, so that, assuming 8 db reduction, the land return would be 2 db and the water return 23 db on the scale of FIG. 3. This signal, having a frequency spectrum of perhaps zero to 400 cycles per second, is transmitted from the receiver 34 to the subtracting circuit 69 comprising diodes 38 and 39 and relay 42. The signal is demodulated by diode 38 to produce a negative unidirectional potential at junction 41 representative of the average strength of the alternating signal.

The signal abstracted from junction 70 at the navigating receiver output contains Doppler frequencies and noise over a spectrum between zero and perhaps 20 k.c.p.s. The Doppler signal consists of a spectrum positioned somewhere within the 0–20 k.c.p.s. range, depending on the aircraft speed. However, it is not the frequency but only the amplitude of the Doppler signal that is of interest. This signal is demodulated by diode 39 to produce a positive unidirectional potential at junction 41 representative of the average strength of the alternating signal.

These positive and negative potentials at junction 41 are applied to the polarized relay winding 42. If the potentials occur simultaneously their difference is effective at winding 42. If, due to path length difference or alternate antenna beaming or for other reasons, the potenitals do not occur simultaneously, the integrating effect of the relay winding circuit avoids misoperation because of disparity in time of occurrence.

Reverting to the above db values, over land the negative potential at junction 41 represents a 2 db signal strength and the positive potential a 7 db signal. The attenuators 36 and 37 should now be adjusted so that the positive and negative potentials at junction 41 are equal and no current flows through relay winding 42. Alternatively, the potentiometer 43 can be adjusted for zero relay current over land. When the oblique and vertical beams strike water, the signal strength at junction 70 is 0 db while that from receiver 34 is 23 db. However, due to the attenuation of 5 db inserted for over land operation at attenuator 37, these figures at junction 41 become −5 db and +23 db, or a difference of 28 db. This difference is represented by a considerable negative potential at junction 41, operating relay 42.

Thus relay 42 remains in its normal or unoperated condition over land and relay contact arms 44 and 46 rest on their back contacts 53 and 48. Contact 48 lights lamp 51, indicating that the airplane is over land. Contact 53 connects resistor 57 into the circuit, causing the potential applied to control local oscillator to be such, and the local oscillator output frequency to be such that the calibration constant of the instrument is correct for over land operation.

When the aircraft is over water, relay 42 is operated, causing arms 44 and 46 to make contact with their forward contacts 52 and 47. Contact 47 lights the "water" lamp 49 and contact 52 removes resistor 57 from the circuit, changing the calibration constant to the correct value for average over water operation.

Use of the polarized relay permits use of other signal ratios than those mentioned. Obviously, with the above recited signal strengths, an unpolarized spring-biased relay may be made to operate as well as the polarized relay.

In one form of microwave Doppler navigation system four beams are employed, two at a time. These beams are indicated in FIG. 2 by the central rays 13, 14, 71 and 72. The beams are controlled by a microwave switch and timer operating at a low frequency, usually between one and ten cycles per second. Diagonal beams are paired. If, for example, the beaming frequency is 1 c.p.s., during the first half second only beams 13 and 72 are emitted, and during the next half second only beams 14 and 71 are emitted.

Figure 4:
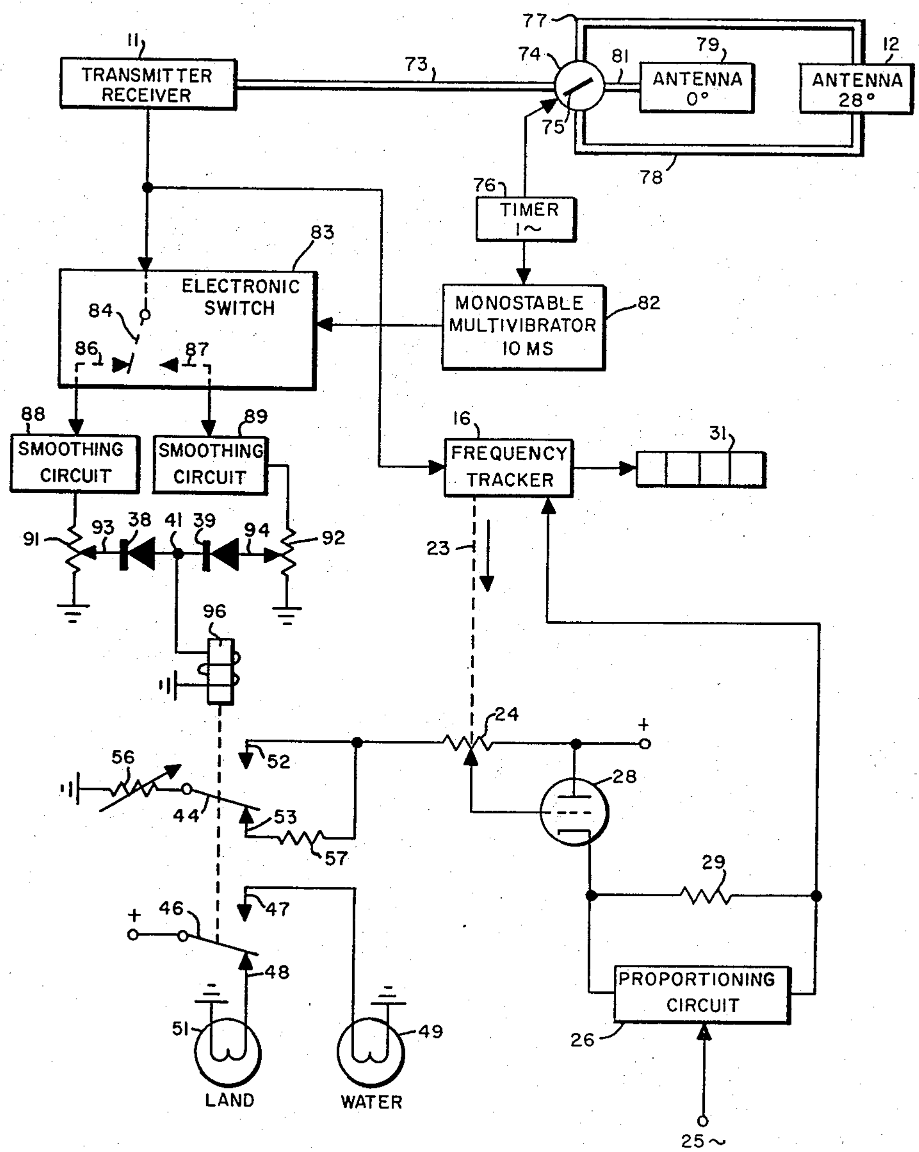
FIGURE 4 is a schematic drawing of an embodiment of the invention employing a separate vertical antenna excited from the transmitter during travel times of the left-right switch.

FIG. 4 illustrates schematically such an arrangement, in which the navigational receiver-transmitter 11 is connected by a waveguide 73 to a switch 74. This switch contains a microwave chamber having four arms arranged in a cross. A resonant paddle 75 affixed on a shaft is positioned in the chamber and is rotated through 90° in one direction or the other by a motor attached to the shaft, so that the paddle assumes either the position shown or a position 90° thereto. The motor is operated by a timer 76 at the rate of 1 c.p.s. Two opposite waveguide connections 77 and 78 connect the switch 74 to the Doppler antenna 12, which is so arranged that when energized through the waveguide 77 its beam 13 directed to right and front and its beam 72 directed to left and rear are emitted, while when energized through waveguide 78 beam 14 directed to right rear and beam 71 directed to left front are emitted. An antenna 79 is directed vertically toward the earth and is energized through the waveguide arm 81 of the switch 74.

The receiver output of receiver-transmitter 11 is applied to a frequency tracker 16 similar to that shown in FIG. 1, operating an aircraft speed counter 31. The frequency tracker integrator shaft 23 is connected to operate the potentiometer 24, and the potentiometer output is connected through cathode follower 28, proportioning circuit 26 and resistor 29 to control the frequency tracker oscillator frequency.

The timer 76 emits a square waveform output which is applied to a monostable multivibrator 82. The multivibrator 82 emits 10-millisecond rectangular pulses at the rate of two per second. These pulses are applied to an electronic switch 83. The operation of this switch is schematically depicted by the contact arm 84 and the two fixed contacts 86 and 87, switch operation being actually electronic and much faster than it would be using a physical contact-making armature. The contacts 86 and 87 are connected through smoothing circuits 88 and 89 to two potentiometers 91 and 92, the sliders 93 and 94 of which are connected to a subtracting circuit comprising diodes 38 and 39, the load being connected to their common junction 41. An electromagnetic relay winding 96 is connected to junction 41. The relay 96 has one contact arm 46 with contacts 47 and 48 connected to operate lamps 49 and 51, and another contact arm 44 with contacts 52 and 53 connected to the circuit of potentiometer 24.

Figure 5:
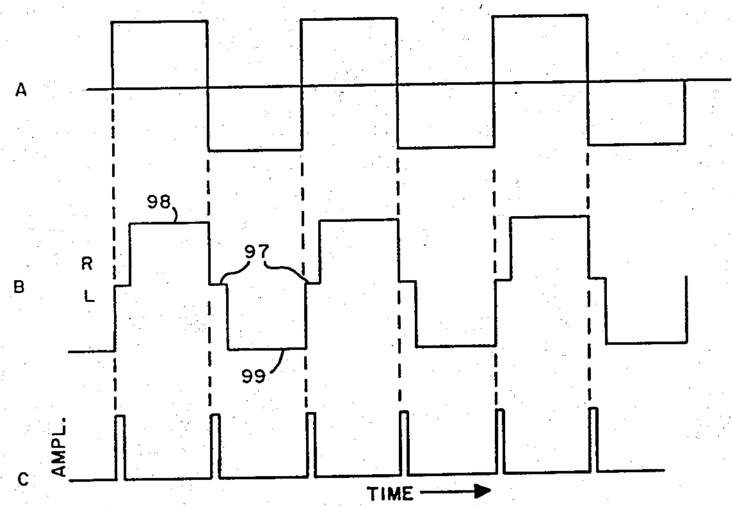
FIGURE 5 is a series of graphs illustrating the operation of the circuit of FIG. 4.

In the operation of the circuit of FIG. 4, waveform A of FIG. 5 depicts the output of timer 76. Times of operation of the switch 74 are shown in B of FIG. 5, the upper portions of the graph representing the times during which the front antenna beam is radiated in the right front direction, and the lower portions of the graph representing the times during which the front antenna beam is radiated in the left front direction. The middle steps 97 represent the travel times of the switch 74 each of which may be, for example, somewhat more than 10 milliseconds. Graph C of FIG. 5 represents the output pulses on the monostable multivibrator 82, each pulse being 10 ms. long. This multivibrator is triggered both by positive-going inputs and by negative-going inputs, in both cases emitting a 10 ms. pulse, but is so arranged as to prevent operation at the travel time terminations.

During the time 98, FIG. 5, the receiver-transmitter 11 is connected through the switch 74 in the position shown to waveguide 77, the antenna 12 energizes beams 13 and 72 and receives echo or back-scatter signals from them. The output of the receiver 11 is transmitted through the path of electronic switch 83 represented by contact 86, and through smoothing circuit 88 to potentiometer 91. Similar action occurs during time 99, FIG. 5.

During each time 97, or at least during that part coincident with the duration of a pulse C of FIG. 5, the switch 74 is in motion, but reasonably efficient transfer of microwave energy exists between waveguide 73 and waveguide 81, so that the antenna 79 is positively excited from the transmitter 11 and echoes or back-scatter signals are transmitted from the antenna 79 through switch 74 to the receiver 11. Waveguide connections 77 and 78 see high impedance at the switch 74, receive substantially no transmitting energy and cannot transmit echo energy to receiver 11. During the times of the pulses C of FIG. 5, the electronics switch is in the position which would be represented by contact of the arm 84 with its fixed contact 87. Echo signals received by the antenna 79 during this pulse time accordingly cause output signals representing these vertical antenna echo signals to be transmitted from receiver 11 through arm 84, contact 87, and smoother 89 to potentiometer 92.

Thus potentiometers 91 and 92 receives substantially continuous signals through smoothers 88 and 89, but the signal energy in potentiometer 92 is of the order of two percent of that in potentiometer 91 since that is the ratio of the duration of one travel time to one-half timing cycle. It is therefore necessary, by means of adjustment of potentiometers 91 and 92 and, if necessary, by amplification, to equalize the energy applied to the subtracting ciruit of diodes 38 and 39 when the aircraft is over land. When, then, the aircraft passes over water, the balance of the signals is upset in the manner heretofore described and relay 96 is operated. This results in operation of lamp 49 and a change in the calibration constant adjustment in the manner described in connection with FIG. 1.

Figure 6:
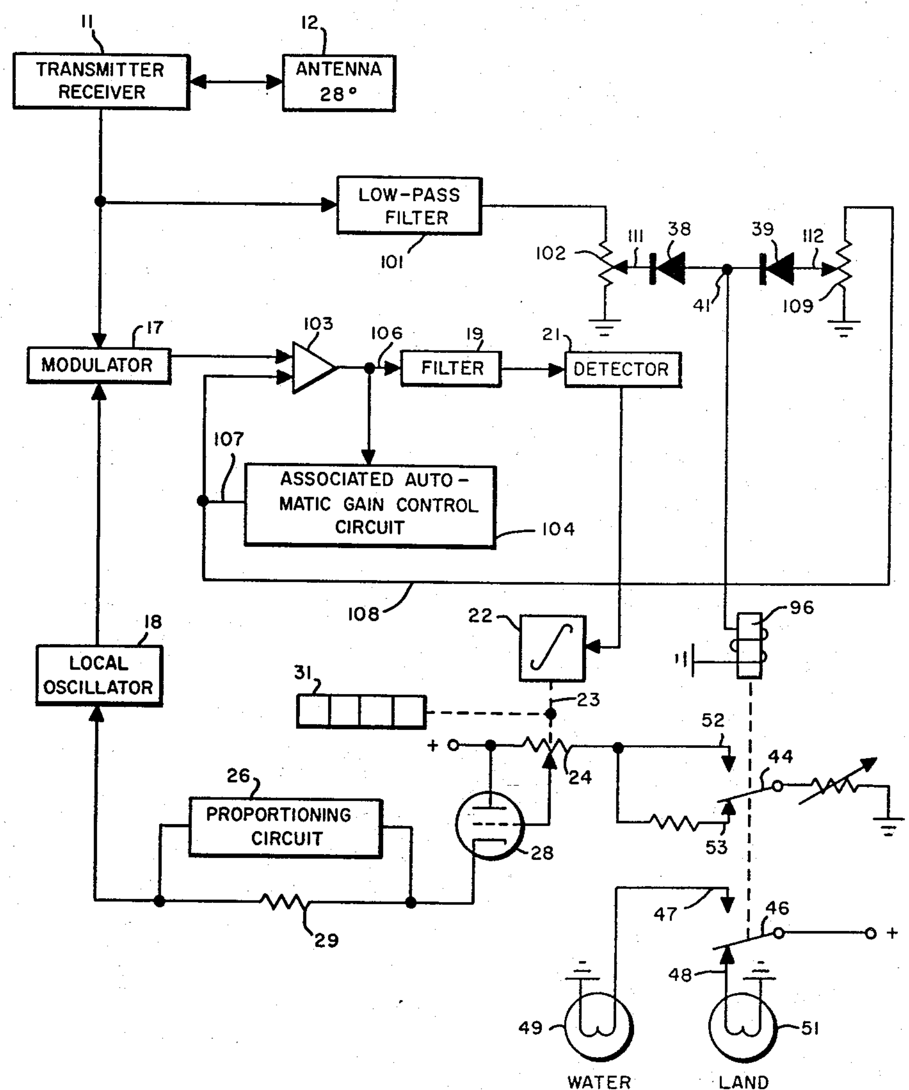
FIGURE 6 is a schematic drawing of an embodiment employing few special parts and employing frequency separation of the vertical and oblique return signals.

The circuit of FIG. 6 in some degree combines the principles of the examples of FIGS. 1 and 4. In FIG. 6, as in FIG. 1, spill energy at 0° from the 28° antenna is relied upon for illumination of the terrain vertically beneath the aircraft and, like the embodiment of FIG. 4, this circuit segregates the vertical echo return from the 28° antenna echo return. It differs, however, in segregating the vertical echo signal on a frequency basis instead of on a time basis.

Referring to FIG. 6, the navigational receiver-transmitter 11, associated 28° navigational antenna 12, and aircraft speed counter 31 are identical with those described in connection with FIGS. 1 and 4. The modulator 17 of the frequency tracker receives its signal from receiver 11. The mechanical shaft 23 output of the frequency tracker integrator 22 positions the slider of potentiometer 24, and the voltage therefrom representative of shaft angular displacement, acting through cathode follower 28, resistor 29 and proportioning circuit 26 controls the frequency of the frequency tracker local oscillator 18. The receiver-transmitter 11 receiver output is also applied through a low-pass filter 101 to potentiometer 102.

The frequency tracker contains an amplifier 103 and an associated automatic gain control circuit 104. The rectified signal current of the control circuit 104 is conventionally employed to bias several of the amplifier 103 stages to maintain constant output-signal amplitude at the conductor 106. This rectified signal current, being closely proportional to input signal amplitude, is available at the output conductor 107 of the automatic gain control circuit 104. This rectified signal current is additionally employed in the circuit of FIG. 6. This current is applied through the conductor 108 to the potentiometer 109. The signals on the potentiometer sliders 111 and 112 are subtracted in the circuit comprising diodes 38 and 39 and the difference at junction 41 is applied to relay 96. The relay contact arms 44 and 46 and their fixed contacts 52, 53, 47 and 48 operate lamps 49 and 51, and through potentiometer 24 control the calibration constant.

Figure 7:
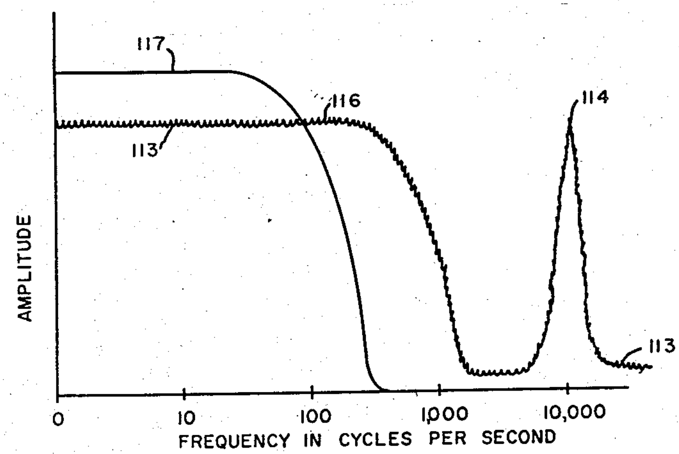
FIGURE 7 is a graph illustrating the operation of the circuit of FIG. 6.

Graph 113, FIG. 7, represents the frequencies and amplitudes of the output of receiver 11. The spectrum 114 at about 10 k.c.p.s. represents a Doppler frequency spectrum. The spectrum 116 from zero to about 400 c.p.s. includes all of the spill due to signal transmission by the 28° antenna 12 in an approximately vertical direction to the terrain, this spill signal generating the signal which is vertically back-scattered. Mixed with the 0–400 c.p.s. spectrum are noise and other signals. However, the amplitude of this vertical signal, when compared with the 28° signal, varies sufficiently between land and water targets to provide a means of identifying the composition of the target area.

The low-pass filter 101, FIG. 6, has a cutoff at not over 400 c.p.s., as shown by graph 117, FIG. 7, so that vertical signal but no Doppler signal is applied to potentiometer 102, FIG. 6. On the other hand, operation of the frequency tracker in its normal manner insures that the automatic gain control signal amplitude is proportional to the Doppler spectrum amplitude and is not affected by amplitudes more than, say 15% below the Doppler central frequency. This signal is applied to potentiometer 109. Therefore the signal applied to potentiometer 109 contains Doppler energies but no vertical beam energies. Thus, the negative current at junction 41 represents vertical return while the positive current at junction 41 represents 28° antenna return. By adjusting the potentiometers 102 and 109, zero relay current is secured for returns from land-reflected signals but relatively large relay current is received for returns from water-reflected signals. Thus the indicating lamps 49 and 51 are made to indicate the nature of the terrain beneath the aircraft while at the same time the instrument's calibration constant is adjusted for equal accuracy of speed and other indications over land and water.

What is claimed is:

1. In a dead reckoning microwave navigator, a land-water calibration constant corrector comprising, microwave radiating means located on an aircraft for illuminating a surface area located approximately vertically beneath the aircraft and an additional surface area displaced from the aircraft vertical, means for receiving microwave echo signals from each of said respective areas and producing a pair of signals each of which is representative of a respective echo signal, means comparing the amplitudes of said pair of signals and for securing a recognition signal therefrom representative of the amount and sense of disparity between said pair of signals, and means operated by said recognition signal for controlling the calibration constant of said dead reckoning microwave navigator.

2. An aircraft Doppler system land-water detector comprising, airborne microwave beam radiating means, said radiating means illuminating at least two areas of the surface of the earth, one of said areas being vertically beneath said aircraft and another of said areas being displaced from the aircraft vertical, receiving means on said aircraft receiving back-scattered energy from both of said areas, means excited by said receiving means for generating two signals each of which is representative of the amplitudes of the energies back-scattered from respective ones of said two areas, comparison means comparing the ratio of amplitudes of said two signals and forming a comparison signal therefrom, said compression signal having a different amplitude when said air craft is over water from when the aircraft is over land, an indicator operated by said comparison signal producing one indication when the comparison signal has an amplitude consequent upon said aircraft being over land and having another indication when the comparison signal has said different amplitude denoting over water operation.

3. An aircraft Doppler system land-water detector in accordance with claim 2 including corrector means operated by said comparison signal for correcting the output of said Doppler system whereby equal accuracies are secured in over-water and over-land operation.

4. An aircraft Doppler system land-water detector comprising, first and second airborne microwave beam antennas, said first antenna being directed toward a first area of the earth in a direction perpendicular to the earth and said second antenna being directed toward a second area of the earth in a direction at an angle greater than eighteen degrees with respect to the aircraft vertical, means including at least one of said antennas for illuminating an area on the earth comprehending both of said first and second areas, said first and second illuminated areas reflecting back-scattered microwave energy toward said aircraft, receiving means on said aircraft coupled to said first and second antennas receiving reflected back-scattered energy from first and second areas, said receiving means emitting two signals having amplitudes respectively representative of the amplitudes of the energies received from said first and second areas, comparison means comparing said two signals and emitting a signal representative of the comparison thereof, and means utilizing said signal.

5. An aircraft Doppler system land-water detector comprising, a microwave beam navigational antenna on said aircraft, each beam thereof making an angle with the aircraft vertical of not less than eighteen degrees, a microwave transmitter exciting said navigational antenna, a navigational microwave receiver receiving microwave echo energy from said navigational antenna and emitting a first signal having an amplitude representative of the amplitude of said microwave echo energy, a microwave vertical beam antenna on said aircraft, said vertical beam antenna having a direction of maximum sensitivity perpendicular to the earth, a second microwave receiver associated therewith for receiving energy transmitted by said transmitter and perpendicularly reflected from the earth, said second microwave receiver emitting a second signal having amplitude representative of the amplitude of the perpendicularly back-scattered echo energy received by said vertical beam antenna, comparison means comparing the amplitudes of said first and second signals and emitting a third signal representative thereof, and means utilizing said signal.

6. An aircraft Doppler system land-water detector in accordance with claim 5 in which said comparison means emitted third signal has two different value ranges, a frequency tracker operated from said navigational microwave receiver, an aircraft ground speed indicator operated from said frequency tracker, and relay means operated by one of said ranges of said third signal indicating that said transmitted microwave energy is echoed from water surfaces, and operative by the other of said ranges for indicating that said transmitted microwave energy is echoed from land surfaces, said relay means also controlling the calibration constant of said frequency tracker to one or another value in accordance with said two value ranges.

7. An aircraft Doppler system land-water detector comprising, a microwave beam navigational antenna on said aircraft, each beam thereof making an angle with the direction perpendicular to the earth of not less than eighteen degrees, a microwave vertical beam antenna on said aircraft, the beam thereof being perpendicular to the earth, a microwave two-position switch connected to said navigational antenna and said vertical beam antenna, a microwave receiver-transmitter connected to said switch, timer means operating said switch whereby during selected periods said receiver-transmitter is connected by said switch to said navigational antenna and during other selected periods said receiver-transmitter is connected by said switch to said vertical beam antenna, a comparator having two input terminals, switch means for selectively connecting the receiver output of said receiver-transmitter to respective ones of said two comparator input terminals, means applying the output of said timer means to said switch means whereby when said receiver-transmitter is connected to said navigational antenna said receiver output is connected to one of said comparator terminals and when said receiver-transmitter is connected to said vertical beam antenna said receiver output is connected to the other of said comparator terminals, said comparator emitting a signal representative of the amplitude comparison of the two input signals applied thereto, and means utilizing said signal.

8. An aircraft Doppler system land-water detector in accordance with claim 7 in which the difference of the two input signals to said comparator has two value ranges resulting in two value ranges of the output signal thereof corresponding to over-water and over-land operation, and electromagnetic relay operated by one output signal range of said comparator and released by the other output signal range of said comparator, indicating means operated by said electromagnetic relay, a frequency tracker connected to said receiver output, and means controlling the calibration constant of said frequency tracker to one of two levels in accordance with the operated or released condition of said electromagnetic relay.

9. An aircraft Doppler system land-water detector comprising, a microwave beam navigational antenna on said aircraft, each beam thereof making an angle with the direction perpendicular to the earth of not less than eighteen degrees, a navigational receiver-transmitter associated therewith, a navigational frequency tracker associated therewith and receiving from the receiver output of said receiver-transmitter a signal containing a Doppler frequency spectrum, means for securing from said frequency tracker a potential proportional to the amplitude of the Doppler spectrum signal applied thereto, a low-pass filter connected to the receiver output of said receiver-transmitter and transmitting signals containing frequencies not higher than one thousand cycles per second, a comparator having two input terminals, means applying said potential to one of said terminals, means applying said filter-transmitted signals to the other of said two terminals, whereby the comparator output signal represents the relative amplitudes of the potential and the signal applied to said two input terminals, and means utilizing said comparator output signal.

10. An aircraft Doppler system land-water detector in accordance with claim 9 in which the difference of the two input signals to said comparator has two value ranges resulting in two value ranges of the output signal thereof corresponding to over-water and over-land operation, an electromagnetic relay operated by one output signal range of said comparator and released by the other output signal range of said comparator, indicating means operated by said electromagnetic relay, and means setting the calibration constant of said frequency tracker at one of two values in accordance with the operated or released condition of said electromagnetic relay.

References Cited in the file of this patent

UNITED STATES PATENTS

| | | |
|---|---|---|
| 2,225,046 | Hunter | Dec. 17, 1940 |
| 2,412,003 | Neufeld | Dec. 3, 1946 |
| 2,687,520 | Fox et al. | Aug. 24, 1954 |